US009512954B2

(12) United States Patent
Gerlovin

(10) Patent No.: US 9,512,954 B2
(45) Date of Patent: Dec. 6, 2016

(54) DEVICE BASE

(71) Applicant: Sonos, Inc., Santa Barbara, CA (US)

(72) Inventor: Mark Gerlovin, Lexington, MA (US)

(73) Assignee: Sonos, Inc., Santa Barbara, CA (US)

( * ) Notice: Subject to any disclaimer, the term of this patent is extended or adjusted under 35 U.S.C. 154(b) by 55 days.

(21) Appl. No.: 14/337,536

(22) Filed: Jul. 22, 2014

(65) Prior Publication Data

US 2016/0025118 A1 Jan. 28, 2016

(51) Int. Cl.
*A47G 29/00* (2006.01)
*F16M 11/04* (2006.01)
*F16B 2/00* (2006.01)
*H04R 1/00* (2006.01)
*H04R 1/02* (2006.01)
*F16B 1/00* (2006.01)
*H04R 1/28* (2006.01)

(52) U.S. Cl.
CPC ............... *F16M 11/04* (2013.01); *F16B 2/005* (2013.01); *H04R 1/00* (2013.01); *H04R 1/026* (2013.01); *F16B 2001/0035* (2013.01); *H04R 1/2873* (2013.01)

(58) Field of Classification Search
CPC .............. F16B 2001/0035; F16B 2/005; H01R 13/6205; F16M 2200/08; F16M 11/04; H04R 1/2873; H04R 1/00; H04R 1/026
USPC ................ 248/346.03, 678, 346.01, 346.04, 206.5,248/309.4; 361/686, 726–727, 579.57–679.58; 24/631, 303
See application file for complete search history.

(56) References Cited

U.S. PATENT DOCUMENTS

| 4,696,037 | A | 9/1987 | Fierens |
| 5,553,147 | A | 9/1996 | Pineau |
| 5,923,902 | A | 7/1999 | Inagaki |
| 6,256,554 | B1 | 7/2001 | DiLorenzo |
| 6,404,811 | B1 | 6/2002 | Cvetko et al. |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 6,809,635 | B1 | 10/2004 | Kaaresoja |
| 6,882,335 | B2 | 4/2005 | Saarinen |

(Continued)

FOREIGN PATENT DOCUMENTS

WO 0153994 7/2001

OTHER PUBLICATIONS

"AudioTron Quick Start Guide, Version 1.0", Voyetra Turtle Beach, Inc., Mar. 2001, 24 pages.
"AudioTron Reference Manual, Version 3.0", Voyetra Turtle Beach, Inc., May 2002, 70 pages.
"AudioTron Setup Guide, Version 3.0", Voyetra Turtle Beach, Inc., May 2002, 38 pages.

(Continued)

*Primary Examiner* — Christopher E Garft
(74) *Attorney, Agent, or Firm* — McDonnell Boehnen Hulbert & Berghoff LLP

(57) ABSTRACT

Embodiments for a base and an assembly of a device and the base are provided. The assembly includes a device having at least one device alignment magnet along a surface of the device, and a base having, along an upper surface of the base, at least one base alignment magnet configured to act on the at least one device alignment magnet to align the device on top of the base, and at least one insert orthogonally plungable through the upper surface of the base. In a first position, the insert is below the upper surface of the base. In a second position, the insert protrudes the upper surface of the base and is contact with the device.

20 Claims, 2 Drawing Sheets

(56) References Cited

U.S. PATENT DOCUMENTS

| | | | |
|---|---|---|---|
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,311,526 | B2 * | 12/2007 | Rohrbach .......... H01R 13/6205 439/218 |
| 7,483,538 | B2 | 1/2009 | McCarty et al. |
| 7,494,098 | B1 * | 2/2009 | Fulda .................. B65F 1/141 220/483 |
| 7,571,014 | B1 | 8/2009 | Lambourne et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2002/0127812 | A1 * | 9/2002 | Matsunaga ........ G01R 1/06761 438/303 |
| 2003/0157951 | A1 | 8/2003 | Hasty |
| 2004/0024478 | A1 | 2/2004 | Hans et al. |
| 2005/0201549 | A1 | 9/2005 | Dedieu et al. |
| 2007/0003067 | A1 | 1/2007 | Gierl et al. |
| 2007/0142944 | A1 | 6/2007 | Goldberg et al. |
| 2007/0265031 | A1 | 11/2007 | Koizumi et al. |
| 2008/0144864 | A1 | 6/2008 | Huon |
| 2008/0146289 | A1 | 6/2008 | Korneluk et al. |
| 2011/0002487 | A1 | 1/2011 | Panther et al. |
| 2012/0051567 | A1 | 3/2012 | Castor-Perry |
| 2013/0022221 | A1 | 1/2013 | Kallai et al. |
| 2013/0129122 | A1 | 5/2013 | Johnson et al. |
| 2013/0248678 | A1 * | 9/2013 | Kramer .................. B65D 33/00 248/545 |

OTHER PUBLICATIONS

"Bluetooth. "Specification of the Bluetooth System: The ad hoc Scatternet for affordable and highly functional wireless connectivity" Core, Version 1.0 A, Jul. 26, 1999, 1068 pages". (in four parts due to size).

"Bluetooth. "Specification of the Bluetooth System: Wireless connections made easy" Core, Version 1.0 B, Dec. 1, 1999, 1076 pages". (in four parts due to size).

"Dell, Inc. "Dell Digital Audio Receiver: Reference Guide" Jun. 2000, 70 pages". (in two parts due to size).

"Dell, Inc. "Start Here" Jun. 2000, 2 pages".

Jo J., et al., "Synchronized One-to-many Media Streaming with Adaptive Playout Control," Proceedings of SPIE, 2002, vol. 4861, pp. 71-82.

"Jones, Stephen. "Dell Digital Audio Receiver: Digital upgrade for your analog stereo" Analog Stereo. Jun. 24, 2000 <http://www.reviewsonline.com/articles/961906864.htm> retrieved Jun. 18, 2014, 2 pages".

"Louderback, Jim. "Affordable Audio Receiver Furnishes Homes With MP3" TechTV Vault. Jun. 28, 2000 <http://www.g4tv.com/articles/17923/affordable-audio-receiver-furnishes-homes-with-mp3/> retrieved Jul. 10, 2014, 2 pages".

"Palm, Inc. "Handbook for the Palm VII Handheld" May 2000, 311 pages".

"UPnP; "Universal Plug and Play Device Architecture"; Jun. 8, 2000; version 1.0; Microsoft Corporation; pp. 1-54".

"Presentations at WinHEC 2000" May 2000, 138 pages.

"Horwitz, Jeremy, "Logic3 i-Station25," retrieved from the Internet: http://www.ilounge.com/index.php/reviews/entry/logic3-i-station25/, last visited Dec. 17, 2013, 5 pages.".

"International Preliminary Search Report for Application No. PCT/US2012/045894, mailed Jan. 30, 2014, 6 pages".

"International Search Report for Application No. PCT/US2012/045894, mailed Dec. 26, 2012, 3 pages".

"Roland Corporation, "Roland announces BA-55 Portable PA System," press release, Apr. 6, 2011, 2 pages.".

"Written Opinion for Application No. PCT/US2012/045894, mailed Dec. 26, 2012, 4 pages".

* cited by examiner

DEVICE BASE

FIELD OF THE DISCLOSURE

The disclosure is related to consumer goods and, more particularly, to methods, systems, products, features, services, and other elements directed to media playback or some aspect thereof.

BACKGROUND

In some cases, electronic devices may move during operation. For instance, an audio speaker device may shift (or "crawl") during operation due to vibrations from the device when playing audio. As such, a device base on which the electronic device may be positioned to minimize any undesired movement may be appreciated.

BRIEF DESCRIPTION OF THE DRAWINGS

Features, aspects, and advantages of the presently disclosed technology may be better understood with regard to the following description, appended claims, and accompanying drawings where:

Figure 1:
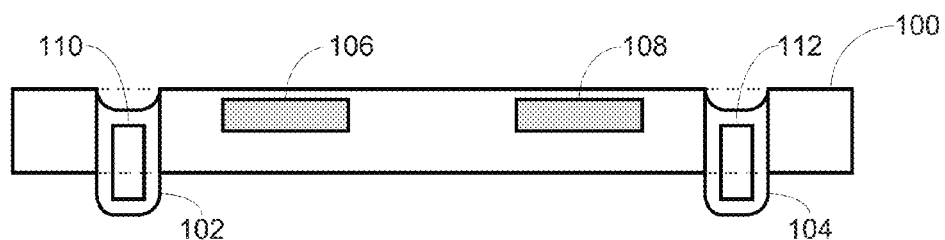
FIG. 1 shows an example device base on which a device may be positioned.

The drawings are for the purpose of illustrating example embodiments, but it is understood that the inventions are not limited to the arrangements and instrumentality shown in the drawings.

DETAILED DESCRIPTION

I. Overview

Examples described herein involve device bases and assemblies in which a device and a corresponding base may be automatically aligned and positioned such that undesired movement of the device during operation of the device is reduced or eliminated.

In one example, an assembly may include a device and a base. The base may have at least one alignment magnet along an upper surface of the base, and at least one insert that is orthogonally plungable through the upper surface of the base. The alignment magnet may be configured to act on a magnetic portion of the device such that when the upper surface of the base and the magnetic portion of the device are within a range of one another, the device and the base may become automatically aligned according to a predetermined position. The magnetic portion of the device may include at least one device alignment magnet along a bottom surface of the device.

The at least one insert may be of a frictive material. In a first position, the at least one insert may be in a sunken or recessed position below the upper surface of the base. The first position of the at least one insert may allow the device and base to become automatically aligned (assisted by alignment magnets) with minimal resistance. In one case, the at least one insert may also have a solid core.

The at least one insert may move from the first position to a second position when the base is placed on a placement surface with the device on top of the base. In one case, the at least one insert may, in the first position, have a lower portion that protrudes below a lower surface of the base. As such, a weight of the device on top of the base may push the base downwards, with the lower portion of the at least one insert pressed against the placement surface, causing the at least one insert to plunge upwards through the base. As such, in the second position of the at least one insert, the at least one insert may protrude the upper surface of the base, and make contact with the device that is on top of the base.

In some cases, a gap between the device and the upper surface base may form when the at least one insert is in the second position, such that only the at least one insert is contacting the device. In this case, if the device produces vibrations during operation of the device, the gap may reduce any noise as a result of the vibrations affecting the base during operation of the device.

In the second position, the frictive quality of the at least one insert that is in contact with the device may grip the device and minimize movement of the device on the base. In one case, the lower portion of the at least one insert may, in the second position, still protrude below the lower surface of the base. As such, the frictive quality of the at least one insert may grip the placement surface and minimize movement of the base on the placement surface. Accordingly, a position of the assembly of the device and the base on the placement surface may be substantially stable and secure.

In some cases, the device may have additional placement orientations. For example, if the device is a rectangular device, the device may be placed according to a horizontal orientation or a vertical orientation. In one case, the same base may be used for either orientation of the device. For instance, if a second orientation of the device involves a second surface of the device as the bottom surface of the device, a second at least one device alignment magnet may be positioned along the second surface of the device such that the at least one alignment magnet along the upper surface of the base can act on the second at least one device alignment magnet to align the second surface of the device to the base. Following a similar change of positions of the at least one insert as described above, the assembly of the device and the base, with the device in the second orientation, may be positioned on the placement surface.

As indicated above, the examples provided herein involve bases and assemblies for electronic devices. In one aspect, a base is provided. The base includes at least one alignment magnet along an upper surface of the base. The at least one alignment magnet is configured to act on a magnetic portion of a device to align the device on top of the base. The base also includes at least one insert orthogonally plungable through the upper surface of the base. In a first position, the insert may be below the upper surface of the base. In a second position, the insert protrudes the upper surface of the base and contacts a lower surface of the device.

In another aspect, an assembly is provided. The assembly includes a device having at least one device alignment magnet along a surface of the device. The assembly also includes a base having, along an upper surface of the base, at least one base alignment magnet configured to act on the at least one device alignment magnet to align the device on top of the base, and at least one insert orthogonally plungable through the upper surface of the base. In a first position, the insert may be below the upper surface of the base. In a second position, the insert protrudes the upper surface of the base and is contact with the device. Other examples are also possible.

While some examples described herein may refer to functions performed by given actors such as "users" and/or other entities, it should be understood that this is for purposes of explanation only. The claims should not be interpreted to require action by any such example actor unless explicitly required by the language of the claims themselves.

II. Example Device Base

FIG. 1 shows an example device base 100 on which a device (such as a speaker device) may be positioned. In some examples, the device base 100 may be a device stand or a part of a device stand. The base 100 includes inserts 102 and 104, and alignment magnets 106 and 108. One of ordinary skill in the art will appreciate that the base 100 shown in FIG. 1 is only one illustrative view of an example base, and that other designs for the base 100 within the scope of discussions herein are also possible.

As shown in FIG. 1, the inserts 102 and 104 are each orthogonally plungable through an upper surface of the base 100. In other words, the positions of the inserts 102 and 104 are vertically shiftable through respective slots in the base 100.

In one example, the inserts 102 and 104 may be made of, at least partially, a fictive or high-friction material. For instance, upper and lower portions of the inserts 102 and 104 may include a high-friction material, while portions of the inserts 102 and 104 that are in contact with the slots in the base 100 structure may include a different material (for example, a less frictive material). In one case, the portions of the inserts 102 and 104 that are in contact with the slots in the base 100 structure may be adhered to the base 100 structure. In another case, the inserts 102 and 104 may be completely made of the high-friction material. Other examples are also possible. The high-friction material may be a rubberized material, a silicon material, or some type of composite material. The inserts 102 and 104 may also include solid cores 110 and 112, respectively. The solid core material may add structural strength and stability to the inserts.

The inserts may be in a sunken, or recessed position below the upper surface of the base 100, or may be flush with the upper surface. This position of the inserts 102 and 104 may be referred to herein as a first position of the inserts 102 and 104. As shown, the inserts 102 and 104 may both protrude a lower surface of the base 100. In one example, a height of the inserts 102 and 104 may be greater than a thickness of the base 100. In other words, in some positions, the inserts 102 and 104 may protrude both the lower surface and the upper surface of the base 100.

While the base 100 shown in FIG. 100 may appear to be uniformly thick, and the inserts 102 and 104 may appear to be of a same size, one of ordinary skill in the art will appreciate that other form factors are also possible for the base 100, and that the inserts 102 and 104 may be of different sizes and shapes compatible with respective other form factors of the base 100. For instance, if the base 100 is thicker where the insert 104 is positioned on the base 100 than where the insert 102 is positioned on the base, the insert 104 may accordingly have a greater height than the insert 102.

Further, while the base 100 as shown in FIG. 1 includes two inserts, one of ordinary skill in the art will appreciate that the base 100 may include any number of inserts. For instance, if the base 100 has a rectangular-shaped base, the base 100 may include an insert placed near each corner of the base 100, for a total of four inserts. The size and dimensions of the inserts 102 and 104 in relation to the size and dimensions of the base 100 structure shown in FIG. 1 are also for illustration purposes only. Inserts 102 and 104 of larger or smaller relative sizes and dimensions are also possible. For instance, while the inserts 102 and 104 shown in FIG. 1 may appear to be cylindrical inserts, other shapes and form factors are also possible for the inserts 102 and 104. For example, inserts 102 and 104 may be conical or frustoconical inserts. In one case, inserts 102 and 104 may be a frustoconical insert having a wider portion towards the upper surface of the base 100, and a narrower portion towards the lower surface of the base 100. Other examples are also possible.

As shown in FIG. 1, the alignment magnets 106 and 108 may be aligned along the upper surface of the base 100. The alignment magnets 106 and 108 are configured to act on a magnetic portion of a device to align the device on top of the base. While the base 100 shown in FIG. 1 includes two alignment magnets, one of ordinary skill in the art will appreciate that the base 100 may include any number of alignment magnets.

In one example, the alignment magnets 106 and 108 may be along the upper surface of the base 100, just below the surface of the base 100. In another example, the alignment magnets 106 and 108 may be exposed on the upper surface of the base 100. In other words, upper surfaces of the alignment magnets 106 and 108 may be exposed and flush with the upper surface of the base 100. Other examples are also possible.

Additional discussions relating to the base 100, the inserts 102 and 104, the alignment magnets 106 and 108, and interactions between the alignment magnets 106, 108 and the magnetic portion of the device are provided below in connection to an example assembly of a device and the base 100.

III. Example Assembly

FIGS. 2A-2D show illustrations of a positioning of an example device 200 on the example base 100 discussed above. The device 200 may be any device that a user may wish to position in a substantially secure and stable manner. In one example, the device 200 may be any an electronic computing device, such as a personal computer, a server, and/or a media playback device. In another example, the device 200 may be an acoustic device, such as an audio speaker. Other examples are also possible. The device 200 includes a device alignment magnet 206 and a device alignment magnet 208. In one example, the device alignment magnets 206 and 208 make up at least a portion of the magnetic portion of the device 200.

Figure 2A:
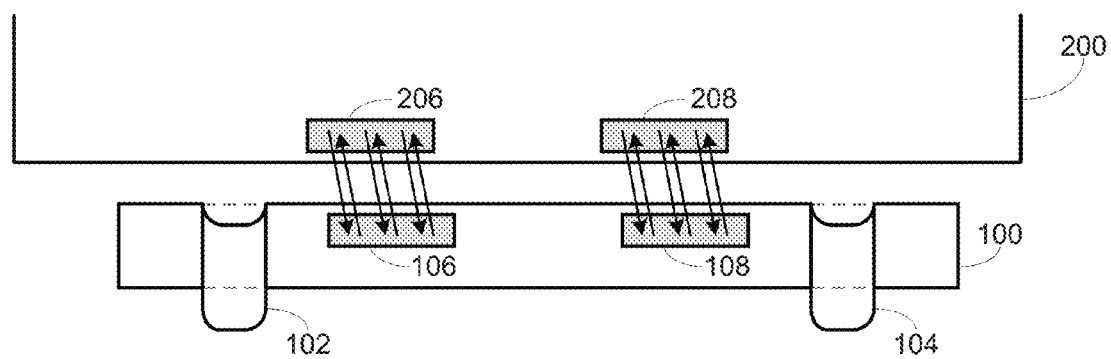
FIGS. 2A-2E show illustrations of a positioning of an example device on an example base.

FIG. 2A shows an example of the device 200 and the base 100 coming within a physical proximity of each other, such that the alignment magnets 106 and 108 may act on the magnetic portion of the device 200. As shown, the alignment magnet 106 may act on the device alignment magnet 206, and the alignment magnet 108 may act on the device alignment magnet 208. As such, the alignment magnet 106 and the device alignment magnet 206 may have opposite polarities, while the alignment magnet 108 and the device alignment magnet 208 may have opposite polarities.

In one example, the alignment magnets 106 and 108 may have the same polarity, while the device alignment magnets 206 and 208 may both have the opposite polarity. In this case, depending on positions of the device 200 and the base 100 when they come within the physical proximity of each other, the alignment magnet 106 may act on the device alignment magnet 208, and/or the alignment magnet 108 may act on the device alignment magnet 206.

In another example, the alignment magnets 106 and 108 may have opposite polarities, and the device alignment magnets 206 and 208 may have opposite polarities such that the alignment magnet 106 attracts the device alignment magnet 206 (and repels the device alignment magnet 208), and the alignment magnet 108 attracts the device alignment magnet 208 (and repels the device alignment magnet 206). In one case, such a configuration may provide a more specific alignment between the device 200 and the base 100. In one example, the attraction force between the alignment magnets of opposite polarity may be in the range of 1-2 lbs. Other examples are also possible.

Figure 2B:
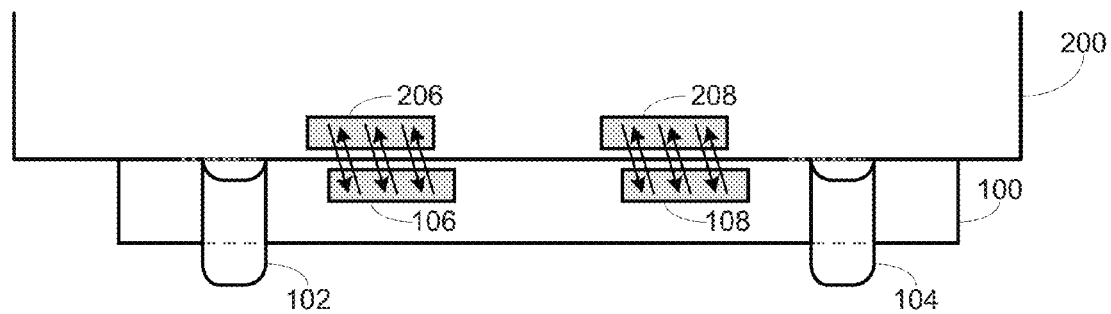

FIG. 2B shows an example of the device 200 and base 100 coming in contact with each other. As shown, a lower surface of the device 200 may be in contact with the upper surface of the base 100. In this case, the device 200 and base 100 may not yet be aligned. Accordingly, the magnetic attractions between alignment magnet 106 and device alignment magnet 206, and the alignment magnet 108 and device alignment magnet 208 may cause the device 200 and base 100 to slide against each other until the device 200 and base are aligned. In one example, one or both of the upper surface of the base and the lower surface of the device may be a low-friction surface such that resistance may be reduced when the device 200 and base 100 slide against each other for alignment.

Figure 2C:
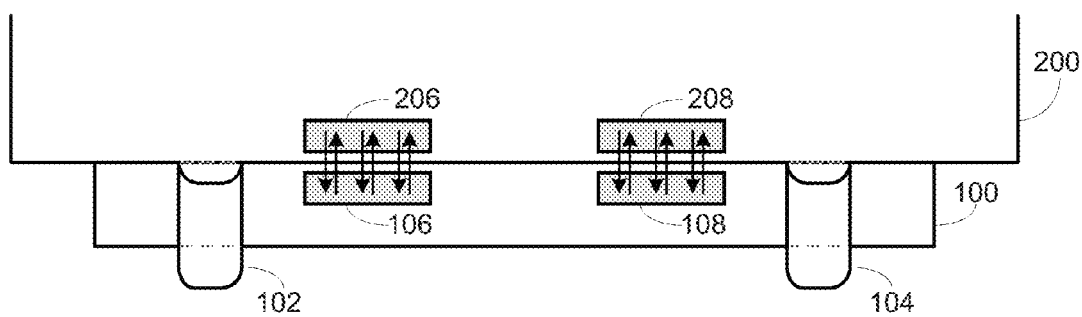

FIG. 2C shows an example of the device 200 and base 100 in alignment with each other. As shown, the magnetic attractions between alignment magnets 106 and device alignment magnet 206, and the alignment magnet 108 and device alignment magnet 208, which previously assisted with the alignment of the device 200 with the base 100, may now assist with maintaining the alignment between the device 200 and the base 100.

As shown in FIG. 2A-2C, the inserts 102 and 104 may, while the device 200 and the base became aligned, remain in the first position of being sunken below the upper surface of the base 100. As indicated above, the inserts 102 and 104 may be made of a fictive material. As such, the first position of the inserts 102 and 104 may be sunken, recessed, flush, or oriented in a position so as to minimize any resistance from the inserts 102 and 104 when the device 200 and base 100 slide against each other for alignment.

While FIGS. 2A-2C show the device 200 coming within the physical proximity of the base 100 from above, before becoming aligned with the base 100 above the base 100, one of ordinary skill in the art will appreciate that alignment between the device 200 and the base 100 may occur from different directions. For instance, in one example, the base 100, while upside down, may be placed above an upside down device 200 for alignment, before being placed on a placement surface right side up. In other words, the device 200 does not necessarily need to be placed on the base 100 while the base is already placed on a placement surface. Rather, the device 200 and the base 100 may be aligned before being placed on the placement surface.

Figure 2D:
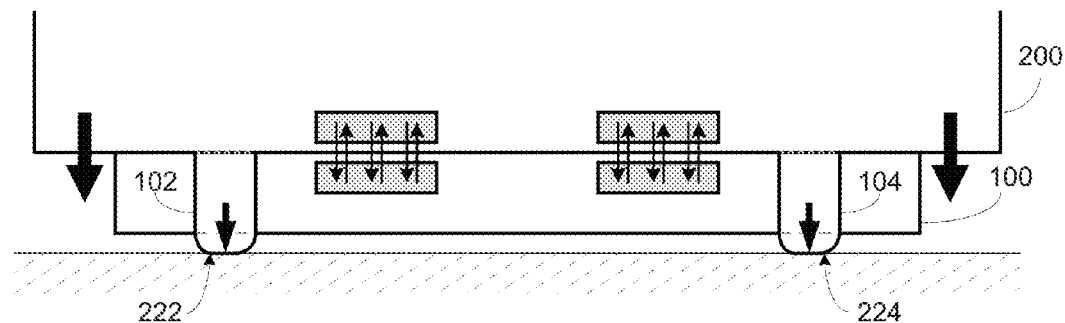

FIG. 2D shows an example of the assembly of the device 200 and the base 100 being placed on a placement surface. In one example, the weight of the device 200 on top of the base 100 may cause lower portions of the inserts 102 and 104 press against the placement surface at contact points 222 and 224, respectively, such that the inserts 102 and 104 plunge upwards through the base 100 structure, against the device 200. In one example, the weight of the device may be 10 lbs or more.

Figure 2E:
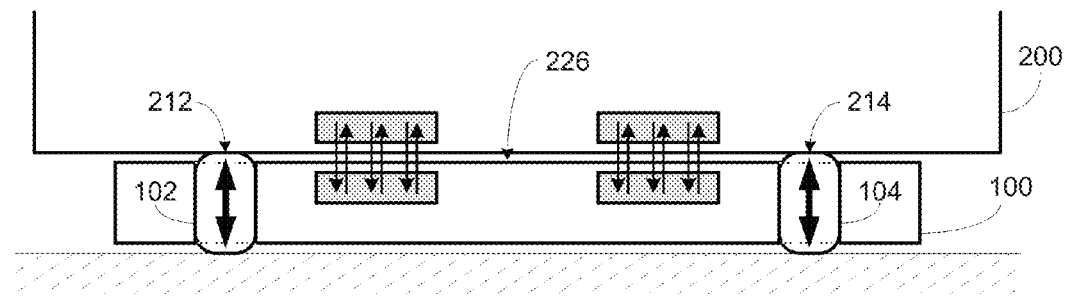

FIG. 2E shows an example of the assembly of the device 200 and the base 100 after the assembly has been placed on a placement surface. The placement surface may be any surface on which a user may wish to place the device 200. In one example, the placement surface may be the top of a desk, table or shelving unit. In another example, the placement surface may be a floor surface. The placement surface may be of a variety of materials, including concrete, wood, plastic, or fabric, among other possibilities.

As shown, as a result of the inserts 102 and 104 plunging upwards against the device, a gap 226 may be formed such that the device 200 is suspended above the base 100 by the inserts 102 and 104 at contact points 212 and 214, respectively, and no longer in contact with the upper surface of the base 100. In some instances, the formation of the gap 226 may involve a decoupling of the alignment magnets 106 and 108 and the device alignment magnets 206 and 208. The position of the inserts 102 and 104 protruding through the upper surface of the base 100 and contacting the device may be referred to herein as a second position of the inserts 102 and 104. In this second position, a frictive quality of the portions of the inserts 102 and 104 that is in contact with the device may grip the device and minimize any movement of the device on the base.

In one example, if vibrations are produced by the device 200 when the device 200 is in operation, the gap 226 may reduce and/or eliminate any noise due to vibrations extending to the base 100 during operation of the device 200. Formation of the gap 226 may depend on one or more of the weight of the device 200, the magnetic strengths of the alignment magnets 106 and 108, the magnetic strengths of the device alignment magnets 206 and 208, a flexibility of the material the inserts 102 and 104 are made of, and a dimension of the solid cores inside the inserts 102 and 104, among others. In one example, inserts having a frustoconical shape (not shown) with a wider upper portion and narrower lower portion may be implemented such that a suitable gap 226 is present after the assembly of the device 200 and base 100 has been placed on the placement surface.

As shown in FIG. 2E, the lower portions of the inserts 102 and 104 may, in some examples, still protrude below the lower surface of the base when the inserts 102 and 104 are in the second position. In such a case, a fictive quality of the lower portions of inserts 102 and 104 that are in contact with the placement surface may grip the placement surface and minimize any movement of the base 100 on the placement surface. Accordingly, a position of the assembly of the device 200 and the base 100 on the placement surface may be substantially stable and secure.

Figure 3:
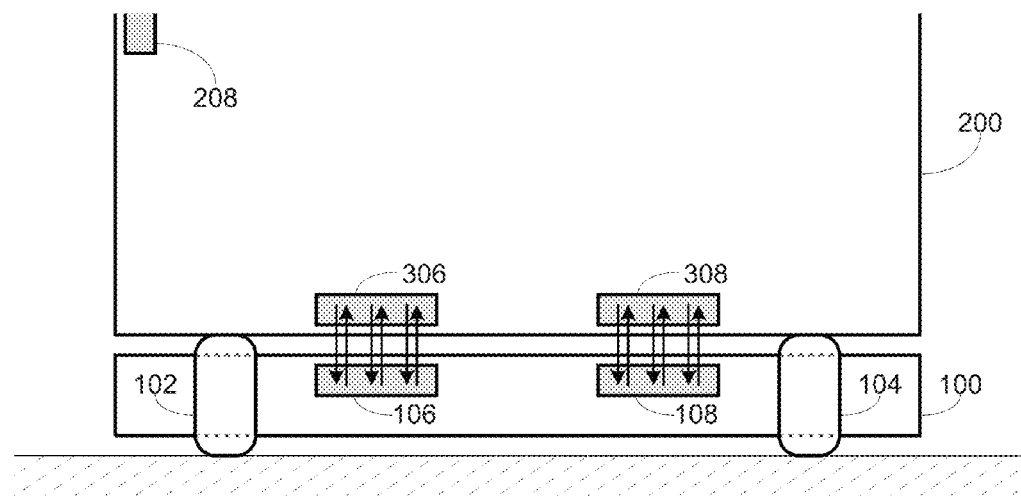
FIG. 3 shows another example positioning of an example device on an example base that is positioned on a surface.

In some cases, devices such as the device 200 may be positioned and operated in different orientations. In one example, the base 100 may be used for stable and secure positioning of the device 200 in multiple orientations. FIG. 3 shows another example positioning of the device 200 on the base 100. As shown, the device 200 may be in a second orientation that is perpendicular to a first orientation of the device 200 shown and described above in connection to FIGS. 2A-2E. In this example, the device 200 may have been turned clockwise such that what was a side of the device 200 in FIGS. 2A-2E is now a lower surface of the device 200. Likewise, what was the lower surface of the device 200 in FIGS. 2A-2E is now a side of the device 200. As shown, the device alignment magnet 208 is now along a side of the device 200.

The device 200 may include device alignment magnets 306 and 308 along what is now the lower surface of the device 200. Accordingly, alignment magnets 106 and 108 of the base 100 may act on the device alignment magnets 306 and 308 to align the device 200 in this second orientation to the base 100. In one example, the lower surface of the device 200 in this second orientation may also be a low-friction surface. Following a similar process of alignment and change of positions of the inserts 102 and 104 as described above, the assembly of the device 200 in this second orientation and the base 100 may be substantially stably and securely placed on a placement surface. The device 200 may further include additional device alignment magnets corresponding to other operational orientations of the device 200. Other examples are also possible.

One of ordinary skill in the art will appreciate that other examples are also possible. For instance, in some embodiments, the solid cores in the inserts 102 and 104 may be magnetic cores configured to act on a magnetic portion of the device 200 to align the device 200 with the base 100, similar to that discussed above. In such a case, the magnetic attraction between the magnetic cores and the magnetic portion of the device 200 should be small enough so as not to raise the insert to be in contact with the device before the aligned assembly of the device 200 and base 100 is placed on a placement surface. The magnetic cores may replace or supplement the alignment magnets 106 and 108.

In another instance, the alignment magnets 106 and 108 may each have a slot in the center through which inserts (similar to the inserts 102 and 104) may be vertically shiftable. As indicated above, the formation of the gap 226 when the assembly of the device 200 and base 100 is placed on the placement surface may involve a decoupling of the alignment magnets 106 and 108 and the device alignment magnets 206 and 208. In some cases, the position of the inserts in the respective centers of the alignment magnets 106 and 108 may assist with the decoupling of the alignment magnets 106 and 108 and the device alignment magnets 206 and 208. The inserts that are vertically shiftable through the alignment magnets 106 and 108 may replace or supplement the inserts 102 and 104. Other examples are also possible.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

I claim:

1. A base comprising:
   at least one alignment magnet along an upper surface of the base, wherein the at least one alignment magnet is configured to act on a magnetic portion of a device to align the device on top of the base;
   at least one slot extending entirely through the upper surface of the base and the lower surface of the base; and
   at least one insert, wherein each of the at least one insert is orthogonally plungable through a respective slot of the at least one slot, wherein a portion of each of the at least one insert is in contact with the respective slot, and wherein (i) in a first position, the at least one insert is entirely below the upper surface of the base, and (ii) in a second position, the at least one insert protrudes the upper surface of the base and contacts a lower surface of the device.

2. The base of claim 1, wherein a weight of the device on top of the base causes the at least one insert to plunge from the first position to the second position.

3. The base of claim 1, wherein in the first position, the at least one insert protrudes a lower surface of the base.

4. The base of claim 1, wherein in the second position, the at least one insert protrudes a lower surface of the base.

5. The base of claim 1, wherein the at least one insert comprises a rubberized material.

6. The base of claim 1, wherein the at least one insert comprises a silicon material.

7. The base of claim 1, wherein the at least one insert comprises a solid core material.

8. The base of claim 1, wherein the at least one insert comprises a high-friction material on an upper portion of the at least one insert and a different material on the portion of the at least one insert that is in contact with the respective slot, and wherein the upper portion of the at least one insert protrudes the upper surface of the base and contacts the lower surface of the device in the second position.

9. The base of claim 1, wherein the upper surface of the base is a low-friction surface.

10. An assembly comprising:
    a device having at least one device alignment magnet along a surface of the device; and
    a base comprising:
    at least one base alignment magnet along an upper surface of the base, wherein the at least base one alignment magnet is configured to act on the at least one device alignment magnet to align the device on top of the base;

at least one slot extending entirely through the upper surface of the base and the lower surface of the base; and at least one insert, wherein each of the at least one insert is orthogonally plungable through a respective slot of the at least one slot, wherein a portion of each of the at least one insert is in contact with the respective slot, and wherein (i) in a first position, the at least one insert is entirely below the upper surface of the base, and (ii) in a second position, the at least one insert protrudes the upper surface of the base and contacts a lower surface of the device.

11. The assembly of claim 10, wherein the at least one device alignment magnet is a first at least one device alignment magnet and the surface of the device is a first surface of the device, wherein the at least one base alignment magnet is configured to align the first surface of the device on top of the base when the device is in a first orientation, wherein the device has a second at least one device alignment magnet along a second surface of the device, and wherein the base alignment magnet is configured to act on the second at least one device alignment magnet to align the second surface of the device on top of the base when the device is in a second orientation.

12. The assembly of claim 11, wherein the second orientation of the device is perpendicular to the first orientation of the device.

13. The assembly of claim 10, wherein a weight of the device on top of the base causes the insert to plunge from the first position to the second position.

14. The assembly of claim 10, wherein in the first position, the at least one insert protrudes a lower surface of the base.

15. The assembly of claim 10, wherein in the second position, the at least one insert protrudes a lower surface of the base.

16. The assembly of claim 10, wherein the at least one insert comprises a high-friction material.

17. The assembly of claim 10, wherein the at least one insert comprises a silicon material.

18. The assembly of claim 10, wherein the at least one insert comprises a solid core material.

19. The assembly of claim 10, wherein the upper surface of the base is a low-friction surface.

20. The assembly of claim 10, wherein the surface of the device is a low-friction surface.

* * * * *